US012728393B2

(12) United States Patent
Horiuchi et al.

(10) Patent No.: US 12,728,393 B2
(45) Date of Patent: Sep. 8, 2026

(54) GAS SEPARATION MEMBRANE

(71) Applicant: SEIKO EPSON CORPORATION, Tokyo (JP)

(72) Inventors: Yuta Horiuchi, Suwa (JP); Hiromu Miyazawa, Azumino (JP); Yasutaka Matsumoto, Suwa (JP); Oshi Iwakami, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 198 days.

(21) Appl. No.: 18/490,374

(22) Filed: Oct. 19, 2023

(65) Prior Publication Data

US 2024/0131478 A1 Apr. 25, 2024
US 2024/0226819 A9 Jul. 11, 2024

(30) Foreign Application Priority Data

Oct. 20, 2022 (JP) ................................ 2022-168209

(51) Int. Cl.
*B01D 53/02* (2006.01)
*B01D 53/22* (2006.01)
(Continued)

(52) U.S. Cl.
CPC ......... *B01D 71/701* (2022.08); *B01D 53/228* (2013.01); *B01D 69/107* (2022.08); *B01D 2256/10* (2013.01); *B01D 2257/504* (2013.01)

(58) Field of Classification Search
CPC .. B01D 71/701; B01D 69/107; B01D 53/228; B01D 2256/10; B01D 2257/504
See application file for complete search history.

(56) References Cited

U.S. PATENT DOCUMENTS 5,342,432 A 8/1994 Haubs et al.
9,216,390 B2 * 12/2015 Ho .................... B01D 67/0069
(Continued)

FOREIGN PATENT DOCUMENTS

JP S6075320 A 4/1985
JP 2021159915 A 10/2021
(Continued)

OTHER PUBLICATIONS

Cstro-Munoz Roberto et al, A new relevant membrane application :CO2 direct air capture (DAC) Chemical Engineering Journal vol. 446,Oct. 1, 2022 p. 137047.
(Continued)

*Primary Examiner* — Christopher P Jones
(74) *Attorney, Agent, or Firm* — CHIP LAW GROUP

(57) ABSTRACT

A gas separation membrane that separates, by selective transmission, carbon dioxide from a mixed gas containing the carbon dioxide and nitrogen, the gas separation membrane including: a first layer; and a second layer provided at one surface of the first layer and composed of a compound having carbon dioxide separation ability, wherein an average thickness of the second layer is smaller than an average thickness of the first layer, and the second layer satisfies $0.56<\xi_2$, where an activity coefficient of nitrogen in the second layer, calculated by the COSMO-RS method, is $\gamma^2_{N2}$, an activity coefficient of carbon dioxide in the second layer is $\gamma^2_{CO2}$, and a separation performance parameter of the second layer at 25° C. is $\xi_2=\ln(\gamma^2_{N2})-\ln(\gamma^2_{CO2})$.

9 Claims, 7 Drawing Sheets

(51) Int. Cl.
*B01D 69/10* (2006.01)
*B01D 71/70* (2006.01)

(56) References Cited

U.S. PATENT DOCUMENTS

2003/0183080 A1* 10/2003 Mundschau .............. C01B 3/16 95/55
2004/0050250 A1* 3/2004 Pinnau ................. B01D 53/228 95/45
2005/0241477 A1* 11/2005 Mundschau ............ C01B 3/503 95/56
2009/0110873 A1* 4/2009 Jiang .................... B01D 63/066 428/116
2011/0030383 A1* 2/2011 Ku ..................... B01D 71/0215 95/45
2012/0297976 A1* 11/2012 Sano ........................ B32B 3/14 95/47
2018/0290111 A1 10/2018 Inomata et al.
2018/0339274 A1 11/2018 Kodama et al.
2019/0076777 A1* 3/2019 Mochizuki ........... B01D 53/228
2019/0151805 A1* 5/2019 Hayashi ................. B01D 69/10

FOREIGN PATENT DOCUMENTS

WO 2013101938 A1 7/2013
WO 2014141868 A1 9/2014

OTHER PUBLICATIONS

Hong Tao et al: Impact of tuning CO2-philicity inpolydimathylsliloxane-based membranes for carbon dioxide separation Journal of Membrane Science, Elsevier BV,NL, vol. 530,Feb. 22, 2017, pp. 213-219.

Yufan J I et al: "High Performance CO2 Capture through Polymer-Based Ultrathin Membranes", ADVA.

Office Action for JP Patent Application No. 2022168209, issued on Jul. 21, 2026, 10 pages.

* cited by examiner

GAS SEPARATION MEMBRANE

The present application is based on, and claims priority from JP Application Serial Number 2022-168209, filed Oct. 20, 2022, the disclosure of which is hereby incorporated by reference herein in its entirety.

BACKGROUND

1. Technical Field

The present disclosure relates to a gas separation membrane.

2. Related Art

Techniques that take in and directly capture carbon dioxide from the atmosphere are being studied towards the goal of carbon neutral. Known techniques of this kind include chemical absorption or adsorption methods in which carbon dioxide is absorbed or adsorbed by an absorption liquid or an adsorption material, as well as membrane separation methods in which carbon dioxide is separated using a gas separation membrane.

For example, JP-A-60-75320 discloses a gas-selective permeable composite membrane which allows selective passage of a specific gas. The gas-selective permeable composite membrane is produced by a process including stacking a thin film of a siloxane compound on a film-shaped polymeric porous support, subjecting the surface layer of the thin film to a plasma treatment using a non-polymerizable gas, and depositing a plasma-polymerized film on the thin film. JP-A-60-75320 also discloses that this process yields a gas-selective permeable composite membrane having strong adhesion between the thin film and the plasma-polymerized film, and that the thickness of the thin film is from 1 μm to 30 μm. Further, JP-A-60-75320 discloses that a gas such as oxygen, hydrogen, or helium is selectively passed through the gas-selective permeable composite membrane, and that the separated gas is captured. It is believed that carbon dioxide can be separated by using such a gas-selective permeable composite membrane.

In the gas-selective permeable composite membrane described in JP-A-60-75320, two thin film layers each composed of an organosiloxane compound are stacked on a porous support. The first layer is a siloxane compound thin film formed by a liquid phase film formation method, and the second layer is a thin film formed by depositing a polymerized product of an organosilane compound formed by a plasma polymerization method.

As a result of repeated studies by the present inventors, it has been found that, when such materials of the same kind are stacked, it is difficult to enhance the selective separation properties of gases. It has also been found that organosiloxane compounds have room for improvement in selective separation properties of carbon dioxide over nitrogen.

Therefore, an object is to realize a gas separation membrane which is excellent in selective separation properties of carbon dioxide over nitrogen and is excellent in carbon dioxide permeability.

SUMMARY

A gas separation membrane according to an application example of the present disclosure is a gas separation membrane that separates, by selective transmission, carbon dioxide from a mixed gas containing the carbon dioxide and nitrogen, the gas separation membrane including:

- a first layer, and
- a second layer provided at one surface of the first layer and composed of a compound having carbon dioxide separation ability, wherein
- an average thickness of the second layer is smaller than an average thickness of the first layer, and
- the second layer satisfies $0.56<\xi_2$, where an activity coefficient of nitrogen in the second layer is $\gamma^2_{N2}$, an activity coefficient of carbon dioxide in the second layer is $\gamma^2_{CO2}$, the activity coefficients being calculated by a COSMO-RS method, and a separation performance parameter of the second layer at 25° C. is $\xi_2=\ln(\gamma^2_{N2})-\ln(\gamma^2_{CO2})$.

DESCRIPTION OF EMBODIMENTS

A gas separation membrane according to an aspect of the present disclosure will be described in detail below with reference to an embodiment illustrated in the accompanying drawings.

1. Outline of Gas Separation Membrane

First, a configuration of a gas separation membrane according to an embodiment will be described.

Figure 1:
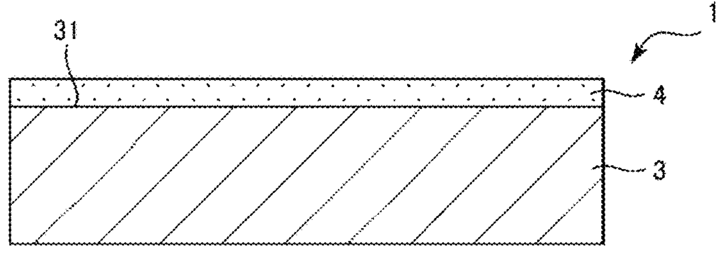
FIG. 1 is a cross-sectional view schematically illustrating a gas separation membrane according to an embodiment.
Figure 1:
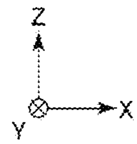

FIG. 1 is a cross-sectional view schematically illustrating a gas separation membrane 1 according to an embodiment. Note that, in FIG. 1, an x-axis, a y-axis, and a z-axis are set as three axes orthogonal to each other, and are indicated by arrows.

The gas separation membrane 1 illustrated in FIG. 1 has the function of allowing selective passage of carbon dioxide from a mixed gas containing carbon dioxide and nitrogen. The gas separation membrane 1 illustrated in FIG. 1 is a composite membrane having a first layer 3 and a second layer 4.

An average thickness of the second layer 4 is set to be smaller than an average thickness of the first layer 3. This allows the second layer 4 to have high gas permeability while having good selective separation properties.

In the gas separation membrane 1 illustrated in FIG. 1, the mixed gas is supplied to the upper side thereof. Therefore, the upper side of the gas separation membrane 1 illustrated in FIG. 1 is referred to as "upstream". In the gas separation membrane 1 illustrated in FIG. 1, carbon dioxide passes through the gas separation membrane 1 from the upper side towards the lower side in FIG. 1. Accordingly, in the following description, the lower side of the gas separation membrane 1 illustrated in FIG. 1 is referred to as "downstream".

1.1. First Layer

The form of the first layer 3 is not particularly limited, and may be a spiral shape, a tubular shape, a hollow fiber shape, or the like in addition to the sheet shape (flat plate shape) illustrated in FIG. 1.

Examples of the constituent material of the first layer 3 include a polymer material. Examples of the polymer material include: polyolefin resins, such as polyethylene and polypropylene; fluororesins, such as polytetrafluoroethylene, polyvinyl fluoride, and polyvinylidene fluoride; polystyrene; cellulose acetate; polyurethane; polyacrylonitrile; polyphenylene oxide; polysulfone; polyethersulfone; polyimide; polyaramid; and organopolysiloxanes.

Among them, an organopolysiloxane is preferably used as the constituent material of the first layer 3. One molecule of the organopolysiloxane contains at least a unit represented by $R^1SiO_{3/2}$ (T unit), a unit represented by $R^2R^3SiO_{2/2}$ (D unit), and a unit represented by $R^4R^5R^6SiO_{1/2}$ (M unit) as basic constituent units. Note that, in each unit, $R^1$ to $R^6$ each represent an aliphatic hydrocarbon or a hydrogen atom. One molecule of the organopolysiloxane contains a combination of the T unit, the D unit, and the M unit.

Specific examples of the organopolysiloxane include polydimethylsiloxane, polymethylphenylsiloxane, polydiphenylsiloxane, polysulfone/polyhydroxystyrene/polydimethylsiloxane copolymer, dimethylsiloxane/methylvinylsiloxane copolymer, dimethylsiloxane/diphenylsiloxane/methylvinylsiloxane copolymer, methyl-3,3,3-trifluoropropylsiloxane/methylvinylsiloxane copolymer, dimethylsiloxane/methylphenylsiloxane/methylvinylsiloxane copolymer, vinyl-terminated diphenylsiloxane/dimethylsiloxane copolymer, vinyl-terminated polydimethylsiloxane, H-terminated polydimethylsiloxane, and dimethylsiloxane-methylhydrosiloxane copolymer. It should be noted that these examples include the forms in which a cross-linking reaction product is formed. The constituent material of the first layer 3 may also be one of these examples or a composite of two or more of these examples, or may be a composite material containing the organopolysiloxane as a main component in mass ratio, in combination with other resin components.

The organopolysiloxane has a large interatomic distance of about 1.8 angstroms in Si—O bonds and Si—C bonds forming it and a large free volume, and thus has good diffusibility of carbon dioxide molecules and good gas permeability for carbon dioxide. Therefore, it is useful as a constituent material of the first layer 3.

The average thickness of the first layer 3, though not particularly limited, is preferably 1 μm or more and 3000 μm or less, more preferably 5 μm or more and 500 μm or less, and further preferably 10 μm or more and 150 μm or less. Due to this feature, the first layer 3 has necessary and sufficient mechanical properties as a base layer of the gas separation membrane 1, and can suppress a decrease in gas permeability.

Note that the average thickness of the first layer 3 is determined, for example, by magnifying and observing a cross section of the gas separation membrane 1 and calculating the average value of thicknesses measured at ten locations of the first layer 3.

The gas permeability of the first layer 3 is preferably set to be higher than that of the second layer 4. Specifically, when carbon dioxide is the target gas component, a gas permeation rate of the first layer 3 is preferably higher than that of the second layer 4. Due to this feature, the first layer 3 can impart good gas permeability to the gas separation membrane 1 while mechanically supporting the second layer 4.

The "high gas permeability" means a high permeation rate of carbon dioxide. Specifically, when carbon dioxide is supplied with the total pressure upstream being set to 4 MPa, the permeation rate of carbon dioxide should be high.

The permeation rate of carbon dioxide of the first layer 3 is preferably $1\times10^{-5}$ $cm^3$ (STP)/$cm^2$·sec·cmHg (10 GPU) or more, more preferably $3\times10^{-5}$ $cm^3$ (STP)/$cm^2$·sec·cmHg (30 GPU) or more, further preferably 100 GPU or more, and particularly preferably 200 GPU or more, when carbon dioxide is supplied upstream at a total pressure of 4 MPa at a temperature of 40° C.

The first layer 3 can be produced by a method for producing a sheet or a film. It can also be produced by a method of forming a film on a sacrificial layer and then removing the sacrificial layer.

1.2. Second Layer

The second layer 4 is formed on an upper surface 31 (one surface) of the first layer 3. By making the average thickness of the second layer 4 smaller than that of the first layer 3, the second layer 4 has good gas permeability.

The second layer 4 gives carbon dioxide separation ability to the gas separation membrane 1. However, the carbon dioxide separation ability depends on the gas used together with carbon dioxide in a mixed gas. Therefore, the present inventors have conducted repeated intensive studies on an index for enhancing the carbon dioxide separation ability when carbon dioxide is selectively separated from a mixed gas of carbon dioxide and nitrogen. Then, the present inventors have found that the carbon dioxide separation ability can be quantified by an index called a separation performance parameter based on an activity coefficient of nitrogen and an activity coefficient of carbon dioxide in the second layer 4, and have completed the present disclosure.

Specifically, the activity coefficient of nitrogen in the second layer 4, calculated by the COSMO-RS method, is $\gamma^2_{N2}$, and the activity coefficient of carbon dioxide in the second layer 4 is $\gamma^2_{CO2}$. The separation performance parameter of the second layer 4 at 25° C. is set as $\xi_2=\ln(\gamma^2_{N2})-\ln(\gamma^2_{CO2})$. At this time, the second layer 4 satisfies $0.56<\xi_2$.

When the separation performance parameter $\xi_2$ satisfies such a relationship, the second layer 4 has higher carbon dioxide separation ability than that of a gas separation membrane using a known organosiloxane compound. The gas separation membrane 1 includes such a second layer 4, and thus has both good selective separation properties of carbon dioxide over nitrogen and good carbon dioxide gas permeability. In the following description, the selective separation properties of carbon dioxide over nitrogen may be simply referred to as "selective separation properties".

The activity coefficient $\gamma^2_{N2}$ of nitrogen in the second layer 4 represents a degree of non-ideality of nitrogen molecules in the second layer 4. The activity coefficient $\gamma^2_{CO2}$ of carbon dioxide in the second layer 4 represents a degree of non-ideality of carbon dioxide molecules in the second layer 4. If the activity coefficient is large, the non-ideality can be said to be large. When the non-ideality of carbon dioxide molecules is smaller than that of nitrogen molecules, the second layer 4 can be considered to have a higher affinity for carbon dioxide molecules than for nitrogen molecules. Therefore, in the present embodiment, the separation performance parameter of the second layer 4 at 25° C. is defined as $\xi_2=\ln(\gamma^2_{N2})-\ln(\gamma^2_{CO2})$. Further, when the separation performance parameter $\xi_2$ satisfies $0.56<\xi_2$, it is possible to acquire carbon dioxide separation ability better than a known one.

Therefore, the gas separation membrane 1 according to the present embodiment is excellent in selective separation properties of carbon dioxide over nitrogen and is excellent in carbon dioxide permeability.

The second layer 4 preferably satisfies $0.80\leq\xi_2$, and more preferably satisfies $0.90\leq\xi_2$. When the separation performance parameter $\xi_2$ of the second layer 4 is lower than the lower limit value, the relative affinity for carbon dioxide molecules to nitrogen molecules in the second layer 4 decreases. For this reason, the selective separation properties of carbon dioxide over nitrogen decrease in the second layer 4. On the other hand, the upper limit value of the separation performance parameter $\xi_2$ need not be particularly set, but is preferably $\xi_2\leq1.50$, and more preferably $\xi_2\leq1.40$, in consideration of availability of constituent materials for realizing it.

The activity coefficient of nitrogen in the first layer 3, calculated by the COSMO-RS method, is $\gamma^1_{N2}$, and the activity coefficient of carbon dioxide in the first layer 3 is $\gamma^1_{CO2}$. The separation performance parameter of the first layer 3 at 25° C. is set as $\xi_1=\ln(\gamma^1_{N2})-\ln(\gamma^1_{CO2})$. At this time, the first layer 3 and the second layer 4 preferably satisfy $\xi_1<\xi_2$.

When the separation performance parameters $\xi_1$ and $\xi_2$ satisfy such a relationship, the affinity for carbon dioxide molecules as compared with that for nitrogen molecules in the second layer 4 is higher than that in the first layer 3. Thus, the selective separation properties of carbon dioxide over nitrogen is enhanced in the second layer 4. On the other hand, the affinity for carbon dioxide molecules is lower in the first layer 3 than in the second layer 4, and thus, even if the pressure increases downstream of the gas separation membrane 1, the probability that carbon dioxide having passed through the gas separation membrane 1 penetrates in an opposite direction to the first layer 3 can be reduced.

The first layer 3 and the second layer 4 preferably satisfy $0.10\leq\xi_2-\xi_1$, more preferably satisfy $0.30\leq\xi_2-\xi_1$, and further preferably satisfy $0.50\leq\xi_2-\xi_1$. This makes it possible to particularly enhance the selective separation properties of carbon dioxide over nitrogen.

The upper limit value of $\xi_2-\xi_1$ need not be particularly set, but is preferably $\xi_2-\xi_1\leq1.20$, and more preferably $\xi_2-\xi_1\leq1.00$, in consideration of availability of constituent materials for realizing it.

Here, the COSMO-RS method will be described. Documents on which the COSMO-RS method is based are the following three References (1) to (3).

(1) Klamt, A. J. Phys. Chem. 99, 2224 (1995).

(2) Klamt, A.; Jonas, V.; Burger, T.; Lohrenz, J. C. J. Phys. Chem. A 102, 5074 (1998).

(3) Eckert, F. and A. Klamt, AIChE Journal, 48, 369 (2002).

The COSMO-RS method is a calculation method in which a chemical potential μ of a molecule is calculated by statistical mechanics with respect to a liquid based on a surface shielding charge σ of the molecule obtained by quantum chemical calculation, and various equilibrium physical property values are determined. The above-described activity coefficients $\gamma^1_{N2}$, $\gamma^1_{CO2}$, $\gamma^2_{N2}$, and $\gamma^2_{CO2}$ can be calculated by the COSMO-RS method.

When the activity coefficient of a molecule is determined, it is necessary to take into account the effects of the volume and surface area of the molecule. These effects are expressed in an Elbro's free-volume combinatorial term. The Elbro's free-volume combinatorial term is described in Reference (4) below.

(4) Elbro, H. S.; Fredenslund, A.; Rasmussen, P. A. Macromolecules 23, 4707(1990).

The free volume corresponds to a volume of a gap in which a low molecule, that is, a nitrogen molecule or a carbon dioxide molecule can move in a polymer, that is, in the first layer 3 or the second layer 4.

When the free volume of an arbitrary molecule i is $v_i^F$, the volume of a hard core of the molecule i is $v_i^*$, and the volume of the molecule i in the system is $v_i$, the free volume $v_i^F$ is represented by the following formula (a).

[Math. 1]

$$v_i^F = v_i - v_i^* \tag{a}$$

The volume $v_i^*$ of the hard core of the molecule i in the above formula (a) is determined by quantum chemical calculation. On the other hand, the volume $v_i$ of the molecule i in the system is represented by the following formula (b) using the molecular weight $M_i$ and density $\rho_i$ of the molecule i.

[Math. 2]

$$v_i = \frac{M_i}{N_A \rho_i} \tag{b}$$

$N_A$ in the above formula (b) is an Avogadro number.

When the behavior of a low molecule in a polymer is calculated, the molecule i is considered to be a polymer. The molecular weight $M_i$ and density $\rho_i$ of the polymer are unified to 10000 and 1.00 g/cc, respectively, and the activity coefficient at a temperature of 25° C. is calculated.

Thermodynamic property estimation software can be used for the calculation by the COSMO-RS method. An example of this software is BIOVIA COSMOtherm 2022 manufactured by Dassault Systèmes S. E. In the parameterization, BP_TZVPD_FINE_20.ctd was used.

The average thickness of the second layer 4, although not particularly limited, is preferably 1 nm or more and 100 nm or less, more preferably 5 nm or more and 90 nm or less, and further preferably 30 nm or more and 80 nm or less. This makes it possible to enhance the gas permeability while ensuring the selective separation properties of the second layer 4. When the average thickness of the second layer 4 is below the lower limit value, the selective separation properties may decrease depending on the constituent material of the second layer 4. On the other hand, when the average thickness of the second layer 4 is above the upper limit value, the gas permeability of the second layer 4 may decrease depending on the constituent material of the second layer 4.

Note that the average thickness of the second layer 4 is determined, for example, by magnifying and observing a cross section of the gas separation membrane 1 and calculating the average value of thicknesses measured at ten locations of the second layer 4.

The second layer 4 is composed of a compound having carbon dioxide separation ability. As described above, the separation performance parameter $\xi_2$ of the second layer 4 at 25° C. satisfies $0.56<\xi_2$, and the separation performance parameter $\xi_2$ depends mainly on the compound forming the second layer 4.

Examples of the compound whose separation performance parameter $\xi_2$ satisfies $0.56<\xi_2$ include polyethylene terephthalate (PET), polyacetal (POM), triacetate, diacetate, polylactic acid (PLA), polyamide 6, polyphenylene sulfide (PPS), cellulose, and derivatives thereof. These compounds provide a separation performance parameter $\xi_2$ satisfying the relationship described above, and has excellent film-forming properties, and the second layer 4 has excellent stability after film formation. When these compounds are used as the constituent material of the second layer 4, the second layer 4 has high selective separation properties.

Figure 2:
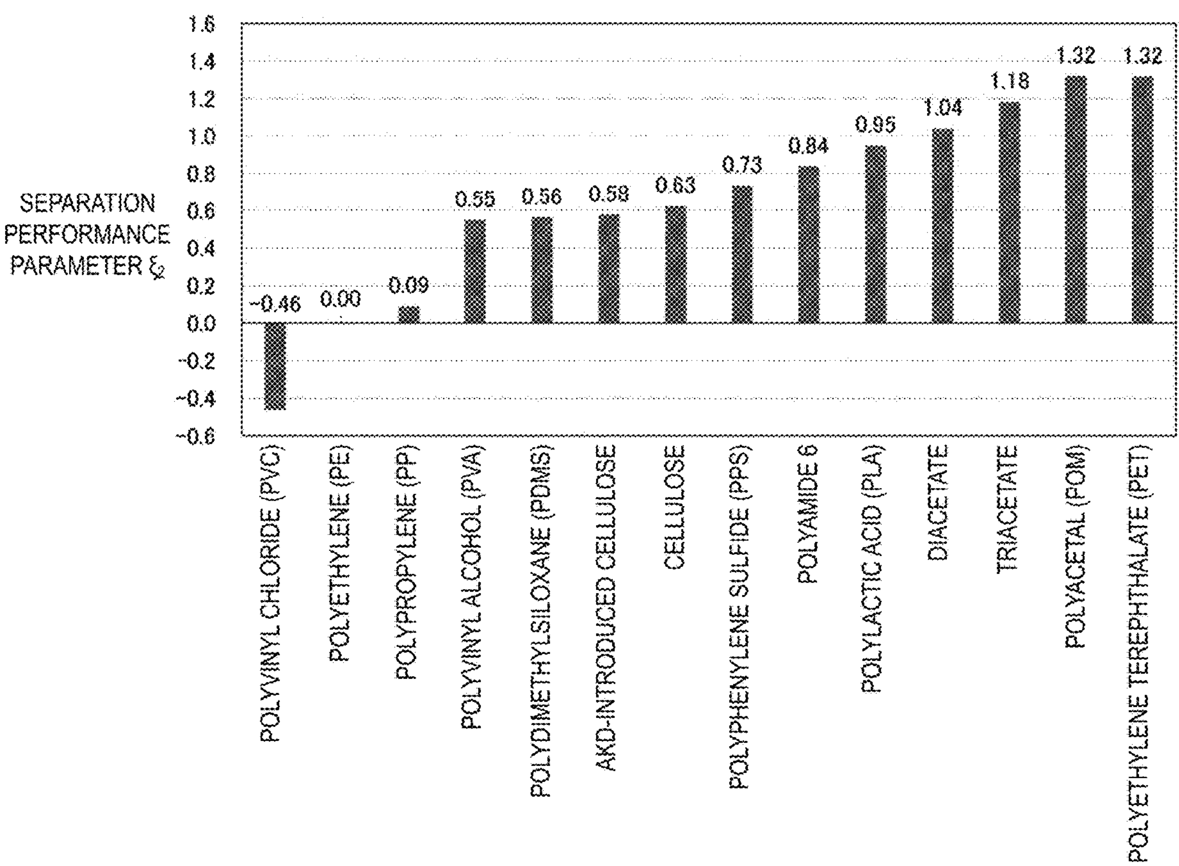
FIG. 2 is a graph for comparing separation performance parameters $\xi_2$ calculated for a plurality of compounds.

FIG. 2 illustrates cellulose derivatives as the derivatives described above. The cellulose derivatives are compounds obtained by introducing an alkyl ketene dimer (AKD) into cellulose (AKD-introduced cellulose). Examples of the derivatives are not limited to these compounds.

In FIG. 2, unsubstituted polydimethylsiloxane (unsubstituted PDMS), polyvinyl alcohol (PVA), polypropylene (PP), polyethylene (PE), and polyvinyl chloride (PVC) are listed as compounds whose separation performance parameter $\xi_2$ does not satisfy $0.56<\xi_2$.

Further, the compounds may contain a coupling agent-derived structure. The coupling agent has a hydrolyzable group and a functional group, and exhibits bondability to the upper surface 31 by hydrolysis of the hydrolyzable group. In addition, the hydrolyzed hydrolyzable group and the hydroxyl group of the upper surface 31 may be converted into a covalent bond by dehydration condensation. By appropriately selecting a substituent to be introduced into PDMS which will be described later as a functional group, the second layer 4 is very thin and excellent in adhesion to the upper surface 31 while satisfying the relationship of $0.56<\xi_2$. Thus, the second layer 4 exhibiting high affinity for carbon dioxide and having good selective separation properties and gas permeability is realized. Therefore, examples of the coupling agent-derived structure include a hydrolysate of the coupling agent and a product obtained by dehydration condensation between the hydrolysate and a hydroxyl group. As the functional group, an atomic group exemplified as a substituent which will be described later is used.

Examples of the compound whose separation performance parameter $\xi_2$ satisfies $0.56<\xi_2$ include, in addition to the compounds described above, compounds presented in Table 1 below.

TABLE 1

| | Symbol | Molecular structure (Smiles) | Compound name |
|---|---|---|---|
| Comparative Example | PDMS | | PDMS |
| Examples | No. 1 | C=CC(=O)OCc1ccccc1 | Poly(benzyl acrylate) |
| | No. 2 | C=CC(=O)Oc2ccc(c1ccccc1)cc2 | Poly(4-biphenyl acrylate) |
| | No. 3 | CCCCOC(=O)C=C | Poly(butyl acrylate) |
| | No. 4 | CC(OC(=O)C=C)CC | Poly(sec-butyl acrylate) |
| | No. 5 | C=CC(=O)Oc1ccccc1C(C) (C)C | Poly(2-tert-butylphenyl acrylate) |
| | No. 6 | C=CC(=O)Oclccc(C(C) (C)C)cc1 | Poly(4-tert-butylphenyl acrylate) |
| | No. 7 | C=CC(=O)Oc1ccc(C#N)cc1 | Poly(4-cyanobenzyl acrylate) |
| | No. 8 | C=CC(=O)OCC(C)C#N | Poly(2-cyanoisobutyl acrylate) |
| | No. 9 | OC(=O)CCCCCCCCC(=O)O•OCCO | Poly(ethylene sebacate) |
| | No. 10 | C=CC(=O)Oc1cccc(C(=O)OC)c1 | Poly(3-methoxycarbonylphenyl acrylate) |
| | No. 11 | C=CC(=O)Oc2ccc1ccccc1c2 | Poly(2-naphthyl acrylate) |
| | No. 12 | OC(=O)c1ccc2c(c1)ccc(c2)C(=O)O•OCCO | Poly(ethylene 2,6-naphthalate) |
| | No. 13 | OC(=O)CCC(=O)O•OCCO | Poly(ethylene succinate) |
| | No. 14 | OC(=O)c1ccc(cc1)C(=O)O•OCCO | Poly(ethylene terephthalate) |

When the compound is a polymer, the degree of polymerization thereof is preferably 10 or more, and more preferably 20 or more. As a result, a more stable second layer 4 can be formed. This applies also to polydimethylsiloxane (PDMS) which will be described later.

FIG. 2 is a graph for comparing the separation performance parameters $\xi_2$ calculated for a plurality of compounds.

As illustrated in FIG. 2, the separation performance parameters $\xi_2$ of the above compounds satisfy $0.56<\xi_2$. Therefore, when these compounds are used as the constituent material of the second layer 4, the second layer 4 has high selective separation properties.

Figure 3:
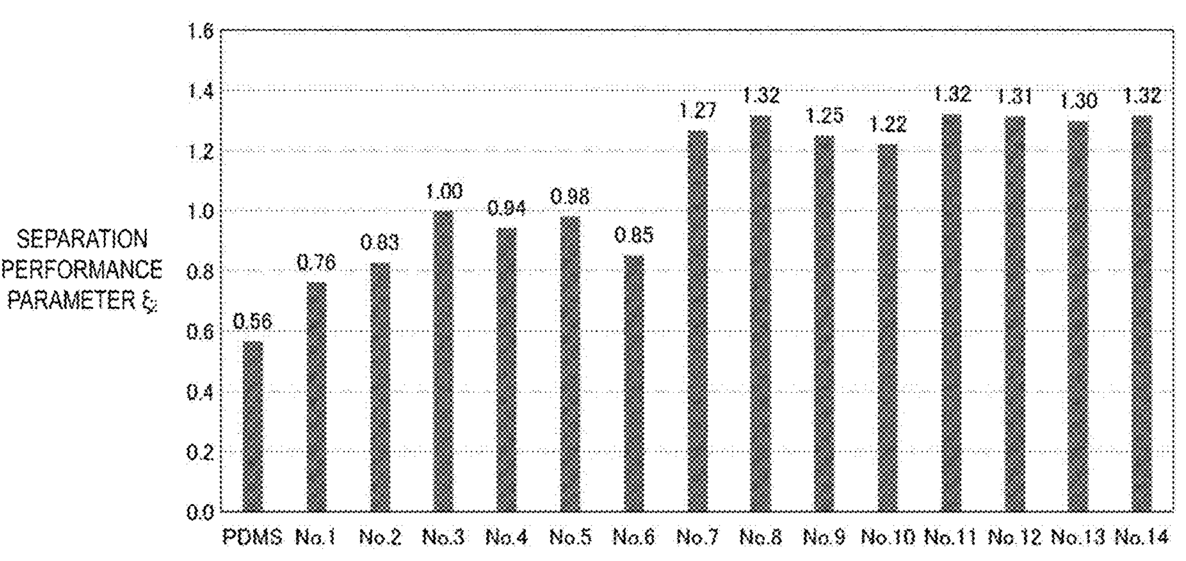
FIG. 3 is a graph for comparing separation performance parameters $\xi_2$ calculated for compounds presented in Table 1.

FIG. 3 is a graph for comparing the separation performance parameters $\xi_2$ calculated for the compounds presented in Table 1. In FIG. 3, unsubstituted polydimethylsiloxane (unsubstituted PDMS) is indicated as a compound whose separation performance parameter $\xi_2$ does not satisfy $0.56<\xi_2$.

As illustrated in FIG. 3, the separation performance parameters $\xi_2$ of the compounds presented in Table 1 satisfy $0.56<\xi_2$. Therefore, when these compounds are used as the constituent material of the second layer 4, the second layer 4 has high selective separation properties.

The compounds presented in Table 1 contain a structure derived from an acrylic acid ester, a methacrylic acid ester, a sebacic acid ester, a naphthalene dicarboxylic acid ester, a succinic acid ester, a phthalic acid ester, or the like in the molecule. That is, the compounds presented in Table 1 contain an ester structure in the molecule. The ester structure refers to an ester bond represented by —COO—, and this structure increases the affinity of the second layer 4 for carbon dioxide molecules. Therefore, the compound containing an ester structure in the molecule is useful as the constituent material of the second layer 4.

Examples of the compound whose separation performance parameter $\xi_2$ satisfies $0.56<\xi_2$ include lignin in addition to the compounds described above.

Figure 4:
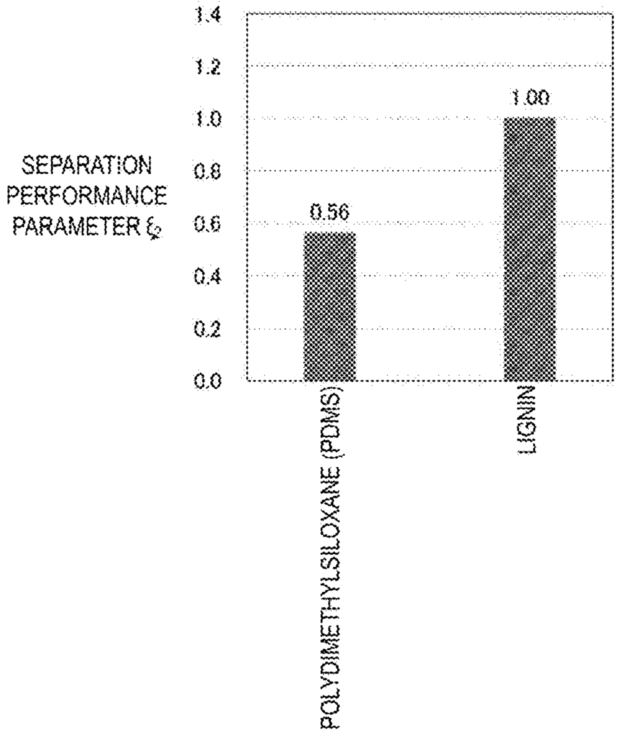
FIG. 4 is a graph for comparing a separation performance parameter $\xi_2$ calculated for lignin.

FIG. 4 is a graph for comparing the separation performance parameter $\xi_2$ calculated for lignin. In FIG. 4, unsubstituted polydimethylsiloxane (unsubstituted PDMS) is indicated as a compound whose separation performance parameter $\xi_2$ does not satisfy $0.56<\xi_2$.

As illustrated in FIG. 4, the separation performance parameter $\xi_2$ of lignin satisfies $0.56<\xi_2$. Therefore, when lignin is used as the constituent material of the second layer 4, the second layer 4 has high selective separation properties.

Lignin contains a benzene ring, a hydroxyl group, and an ether bond in the molecule. These structures increase the affinity of the second layer 4 for carbon dioxide molecules.

Examples of the compound whose separation performance parameter $\xi_2$ satisfies $0.56<\xi_2$ include polydimethylsiloxane derivatives in addition to the compounds described above.

Figure 5:
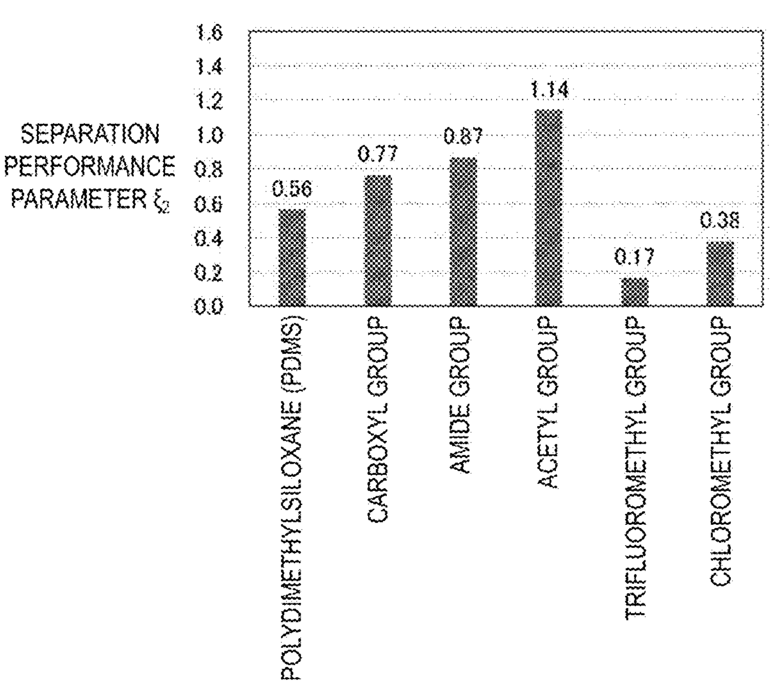
FIG. 5 is a graph for comparing separation performance parameters $\xi_2$ calculated for polydimethylsiloxane derivatives.

FIG. 5 is a graph for comparing the separation performance parameters $\xi_2$ calculated for polydimethylsiloxane derivatives.

FIG. 5 illustrates polydimethylsiloxane derivatives whose separation performance parameter $\xi_2$ satisfies $0.56<\xi_2$. Therefore, when polydimethylsiloxane derivatives are used as the constituent material of the second layer 4, the second layer 4 has high selective separation properties.

Polydimethylsiloxane has a siloxane bond as a main chain and a methyl group in a side chain or at a terminal. Examples of the polydimethylsiloxane derivative herein include derivatives obtained by substituting one or more hydrogen atoms, preferably one hydrogen atom, of a methyl group with a substituent. Examples of the substituent include a carboxyl group, an amide group, and an acetyl group.

In FIG. 5, unsubstituted polydimethylsiloxane (unsubstituted PDMS), trifluoromethyl group-substituted PDMS, and chloromethyl group-substituted PDMS are indicated as compounds whose separation performance parameter U does not satisfy $0.56<\xi_2$.

All of the methyl groups contained in the polydimethylsiloxane may be substituted as described above, but it is preferable that only some of the methyl groups are substituted. Thus, the separation performance parameter $\xi_2$ becomes particularly large in the second layer 4. The separation performance parameters $\xi_2$ illustrated in FIG. 5 each are a value when one of hydrogen atoms of the methyl groups is substituted with each substituent in 25% of the methyl groups contained in the polydimethylsiloxane. In FIG. 5, the names of the substituents used in substitution are shown.

Figure 6:
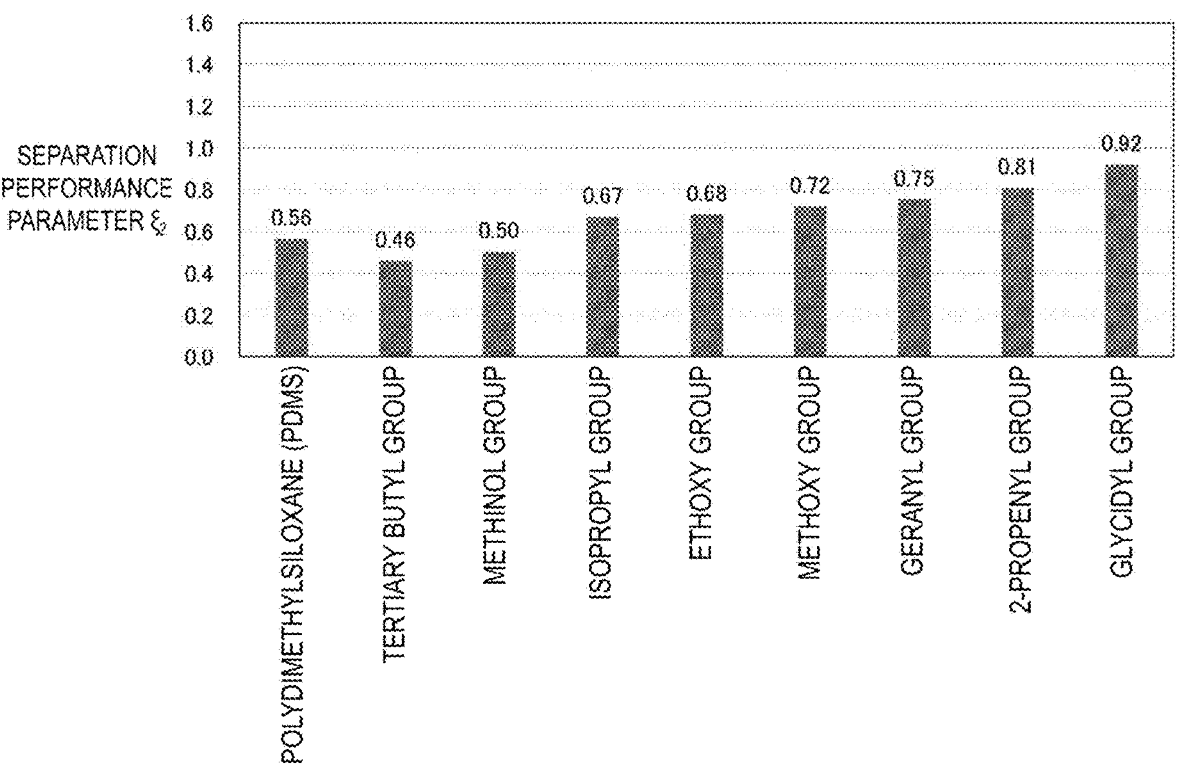
FIG. 6 is a graph for comparing separation performance parameters $\xi_2$ calculated for polydimethylsiloxane derivatives.

FIG. 6 is a graph for comparing the separation performance parameters $\xi_2$ calculated for polydimethylsiloxane derivatives.

FIG. 6 illustrates polydimethylsiloxane derivatives whose separation performance parameter $\xi_2$ satisfies $0.56<\xi_2$. Therefore, when polydimethylsiloxane derivatives are used as the constituent material of the second layer 4, the second layer 4 has high selective separation properties.

Polydimethylsiloxane has a siloxane bond as a main chain and a methyl group in a side chain or at a terminal. Examples of the polydimethylsiloxane derivative herein include derivatives obtained by substituting one or more hydrogen atoms, preferably one hydrogen atom, of a methyl group with a substituent. Examples of the substituent include an isopropyl group, an ethoxy group, a methoxy group, a geranyl group, a 2-propenyl group, and a glycidyl group.

In FIG. 6, unsubstituted polydimethylsiloxane (unsubstituted PDMS), tertiary butyl group-substituted PDMS, and methinol group-substituted PDMS are indicated as compounds whose separation performance parameter $\xi_2$ does not satisfy $0.56<\xi_2$.

All of the methyl groups contained in the polydimethylsiloxane may be substituted as described above, but it is preferable that only some of the methyl groups are substituted. Thus, the separation performance parameter $\xi_2$ becomes particularly large in the second layer 4. The separation performance parameters $\xi_2$ illustrated in FIG. 6 each are a value when one of hydrogen atoms of the methyl groups is substituted with each substituent in 25% of the methyl groups contained in the polydimethylsiloxane. In FIG. 6, the names of the substituents used in substitution are shown.

Figure 7:
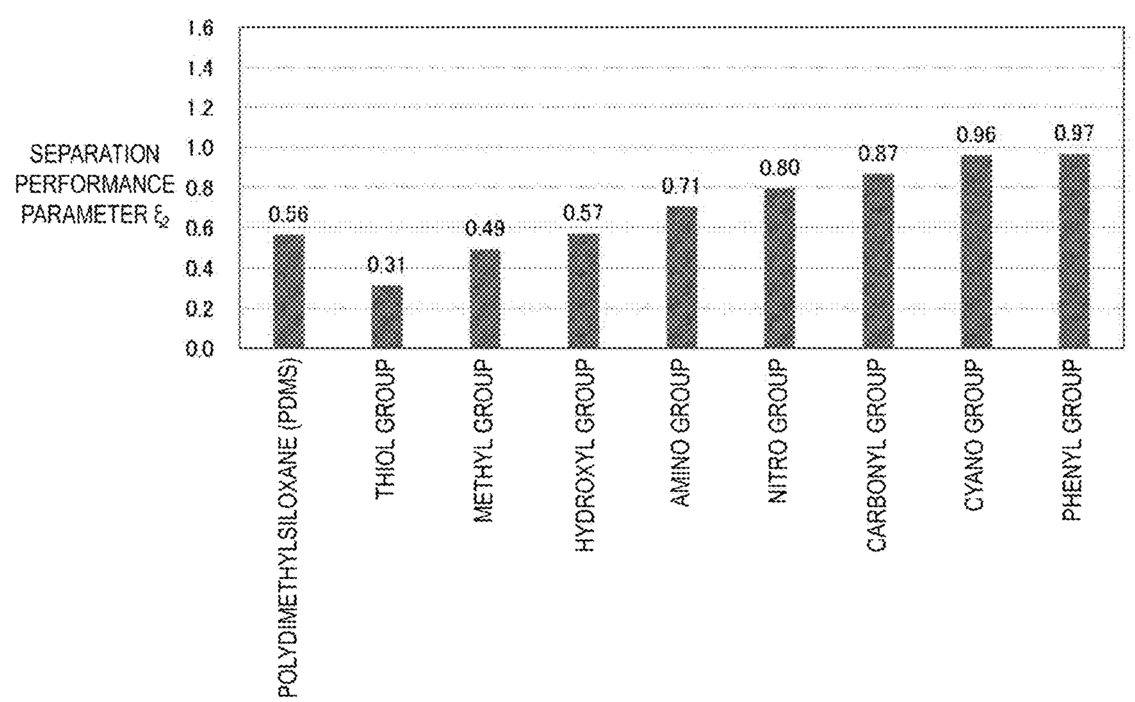
FIG. 7 is a graph for comparing separation performance parameters $\xi_2$ calculated for polydimethylsiloxane derivatives.

FIG. 7 is a graph for comparing the separation performance parameters $\xi_2$ calculated for polydimethylsiloxane derivatives.

FIG. 7 illustrates polydimethylsiloxane derivatives whose separation performance parameter $\xi_2$ satisfies $0.56<\xi_2$. Therefore, when polydimethylsiloxane derivatives are used as the constituent material of the second layer 4, the second layer 4 has high selective separation properties.

Polydimethylsiloxane has a siloxane bond as a main chain and a methyl group in a side chain or at a terminal. Examples of the polydimethylsiloxane derivative herein include derivatives obtained by substituting one or more hydrogen atoms, preferably one hydrogen atom, of a methyl group with a substituent. Examples of the substituent include a hydroxyl group, an amino group, a nitro group, a carbonyl group, a cyano group, and a phenyl group.

In FIG. 7, unsubstituted polydimethylsiloxane (unsubstituted PDMS), thiol group-substituted PDMS, and methyl group-substituted PDMS are indicated as compounds whose separation performance parameter $\xi_2$ does not satisfy $0.56<\xi_2$.

All of the methyl groups contained in the polydimethylsiloxane may be substituted as described above, but it is preferable that only some of the methyl groups are substituted. Thus, the separation performance parameter $\xi_2$ becomes particularly large in the second layer 4. The separation performance parameters $\xi_2$ illustrated in FIG. 7 each are a value when one of hydrogen atoms of the methyl groups is substituted with each substituent in 25% of the methyl groups contained in the polydimethylsiloxane. In FIG. 7, the names of the substituents used in substitution are shown.

Figure 8:
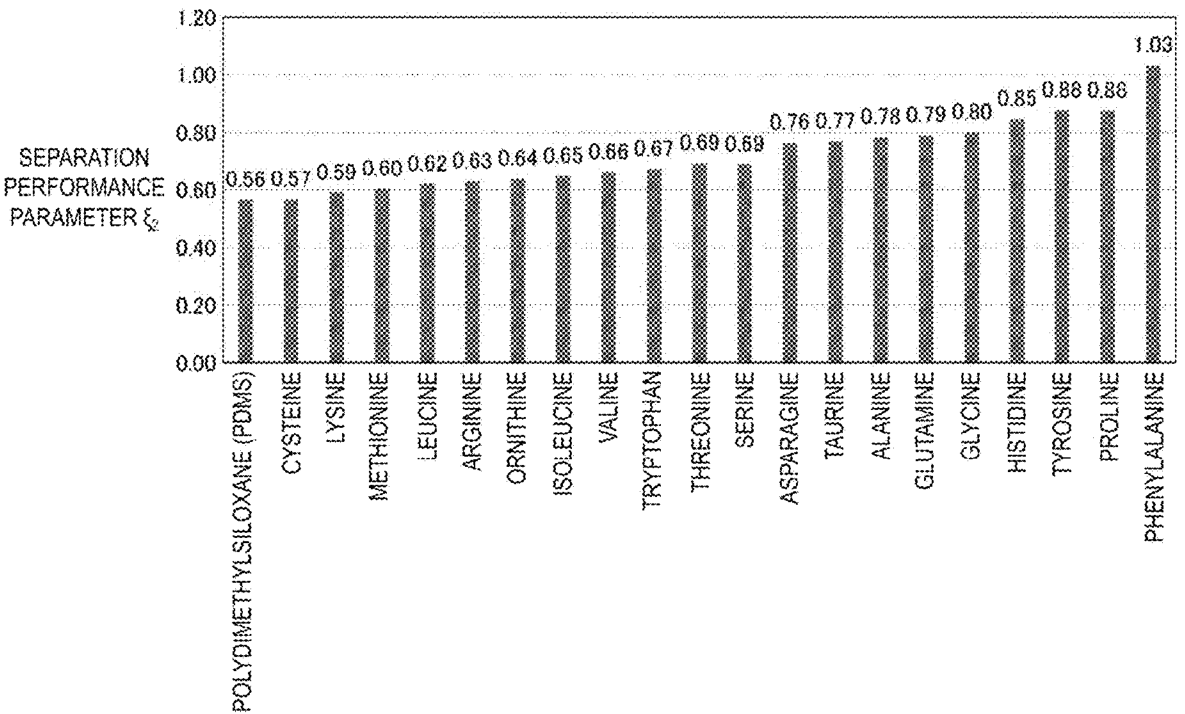
FIG. 8 is a graph for comparing separation performance parameters $\xi_2$ calculated for polydimethylsiloxane derivatives.

FIG. 8 is a graph for comparing the separation performance parameters $\xi_2$ calculated for polydimethylsiloxane derivatives.

FIG. 8 illustrates polydimethylsiloxane derivatives whose separation performance parameter $\xi_2$ satisfies $0.56<\xi_2$. Therefore, when polydimethylsiloxane derivatives are used as the constituent material of the second layer 4, the second layer 4 has high selective separation properties.

Polydimethylsiloxane has a siloxane bond as a main chain and a methyl group in a side chain or at a terminal. Examples of the polydimethylsiloxane derivative herein include derivatives obtained by substituting one or more hydrogen atoms, preferably one hydrogen atom, of a methyl group with a substituent. Examples of the substituent include a substituent derived from an amino acid, which is an atomic group obtained by substituting a hydrogen atom with a —COO— moiety derived from a carboxyl group of the amino acid. Examples of the amino acid providing the substituent include cysteine, lysine, methionine, leucine, arginine, ornithine, isoleucine, valine, tryptophan, threonine, serine, asparagine, taurine, alanine, glutamine, glycine, histidine, tyrosine, proline, and phenylalanine.

In FIG. 8, unsubstituted polydimethylsiloxane (unsubstituted PDMS) is indicated as a compound whose separation performance parameter $\xi_2$ does not satisfy $0.56<\xi_2$.

All of the methyl groups contained in the polydimethylsiloxane may be substituted as described above, but it is preferable that only some of the methyl groups are substituted. Thus, the separation performance parameter $\xi_2$ becomes particularly large in the second layer 4. The separation performance parameters $\xi_2$ illustrated in FIG. 8 each are a value when one of hydrogen atoms of the methyl groups is substituted with each amino acid-derived substituent in 25% of the methyl groups contained in the polydimethylsiloxane. In FIG. 8, the names of the amino acids used in substitution are shown.

Figure 9:
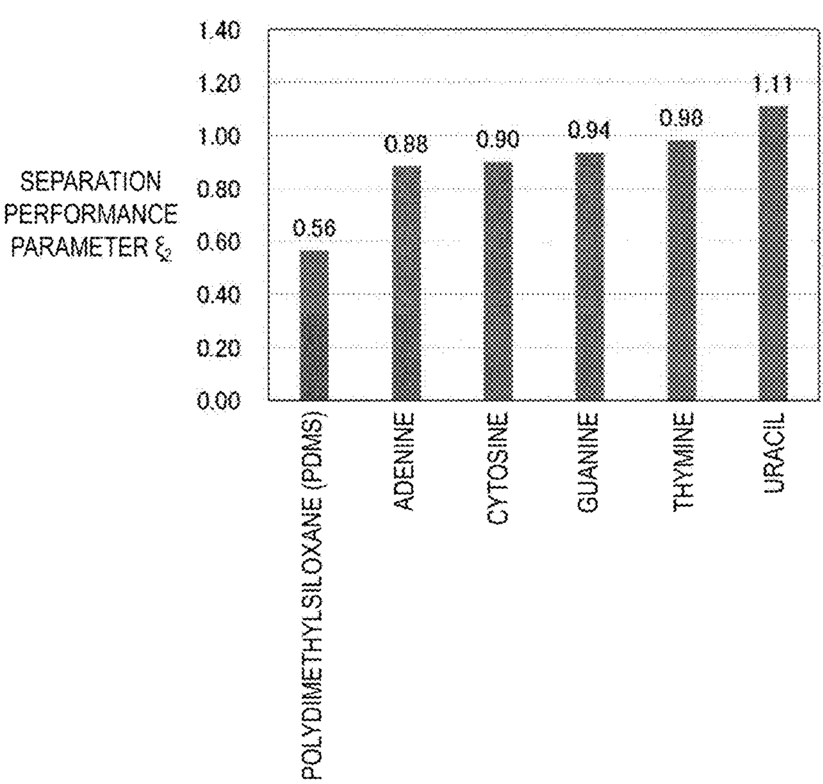
FIG. 9 is a graph for comparing separation performance parameters $\xi_2$ calculated for polydimethylsiloxane derivatives.

FIG. 9 is a graph for comparing the separation performance parameters $\xi_2$ calculated for polydimethylsiloxane derivatives.

FIG. 9 illustrates polydimethylsiloxane derivatives whose separation performance parameter $\xi_2$ satisfies $0.56<\xi_2$. Therefore, when polydimethylsiloxane derivatives are used as the constituent material of the second layer 4, the second layer 4 has high selective separation properties.

Polydimethylsiloxane has a siloxane bond as a main chain and a methyl group in a side chain or at a terminal. Examples of the polydimethylsiloxane derivative herein include derivatives obtained by substituting one or more hydrogen atoms, preferably one hydrogen atom, of a methyl group with a substituent. Examples of the substituent include a substituent derived from a nucleic acid base. Examples of the nucleic acid base providing the substituent include adenine, cytosine, guanine, thymine, and uracil.

In FIG. 9, unsubstituted polydimethylsiloxane (unsubstituted PDMS) is indicated as a compound whose separation performance parameter $\xi_2$ does not satisfy $0.56<\xi_2$.

All of the methyl groups contained in the polydimethylsiloxane may be substituted as described above, but it is preferable that only some of the methyl groups are substituted. Thus, the separation performance parameter $\xi_2$ becomes particularly large in the second layer 4. The separation performance parameters $\xi_2$ illustrated in FIG. 9 each are a value when one of hydrogen atoms of the methyl groups is substituted with each nucleic acid base-derived substituent in 25% of the methyl groups contained in the polydimethylsiloxane. In FIG. 9, the names of the nucleic acid bases used in substitution are shown.

Figure 10:
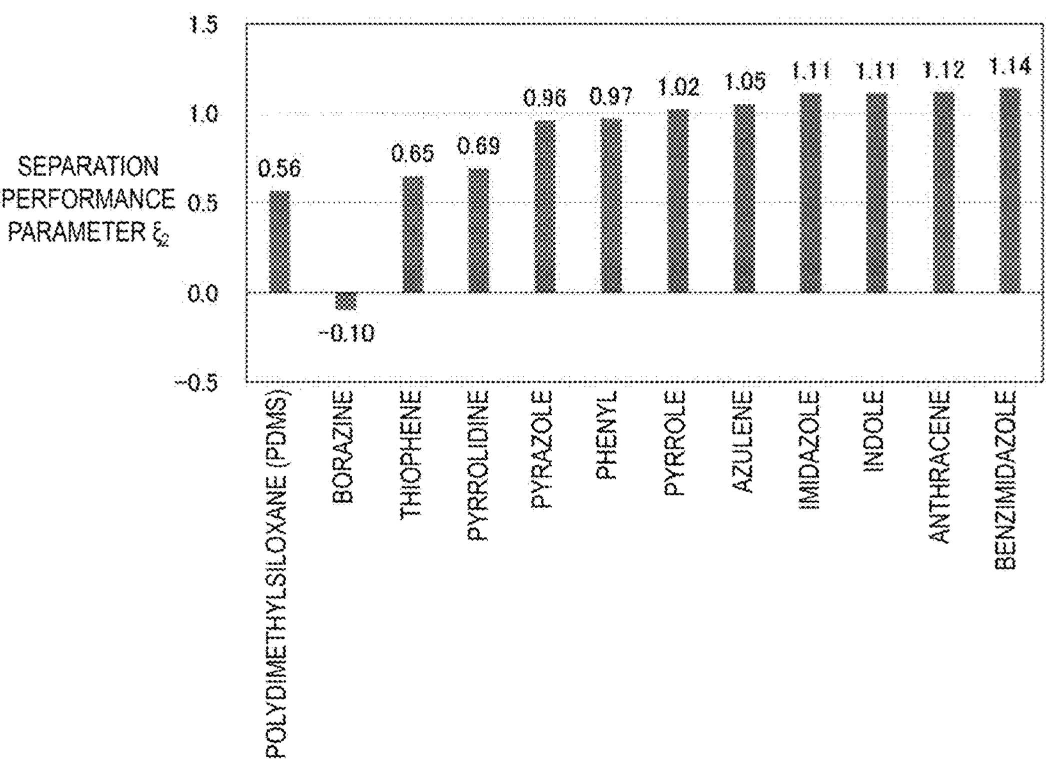
FIG. 10 is a graph for comparing separation performance parameters $\xi_2$ calculated for polydimethylsiloxane derivatives.

FIG. 10 is a graph for comparing the separation performance parameters $\xi_2$ calculated for polydimethylsiloxane derivatives.

FIG. 10 illustrates polydimethylsiloxane derivatives whose separation performance parameter $\xi_2$ satisfies $0.56<\xi_2$. Therefore, when polydimethylsiloxane derivatives are used as the constituent material of the second layer 4, the second layer 4 has high selective separation properties.

Polydimethylsiloxane has a siloxane bond as a main chain and a methyl group in a side chain or at a terminal. Examples of the polydimethylsiloxane derivative herein include derivatives obtained by substituting one or more hydrogen atoms, preferably one hydrogen atom, of a methyl group with a substituent. Examples of the substituent include a substituent derived from an organic compound having a π-conjugated cyclic structure. The π-conjugated cyclic structure is a cyclic structure including a site in which a double bond and a single bond are alternately connected. Examples of the organic compound providing the substituent include thiophene, pyrrolidine, pyrazole, phenyl, pyrrole, azulene, imidazole, indole, anthracene, and benzimidazole.

From the results illustrated in FIG. 10, it is understood that a nitrogen atom or a carbon atom is preferably contained as a constituent atom of the cyclic structure. In particular, it is also understood to be preferable that the cyclic structure is a nitrogen-containing heterocyclic ring in which two or more nitrogen atoms are contained in one cyclic structure, that the cyclic structure is an aromatic ring, and that the cyclic structure is a condensed ring. Thus, the separation performance parameter $\xi_2$ can be made particularly high, and the second layer 4 has particularly high selective separation properties.

In FIG. 10, unsubstituted polydimethylsiloxane (unsubstituted PDMS) and PDMS substituted with a substituent derived from borazine are indicated as compounds whose separation performance parameter $\xi_2$ does not satisfy $0.56<\xi_2$.

All of the methyl groups contained in the polydimethylsiloxane may be substituted as described above, but it is preferable that only some of the methyl groups are substituted. Thus, the separation performance parameter $\xi_2$ becomes particularly large in the second layer 4. The separation performance parameters $\xi_2$ illustrated in FIG. 10 each are a value when one of hydrogen atoms of the methyl groups is substituted with each nucleic acid base-derived substituent in 25% of the methyl groups contained in the polydimethylsiloxane. In FIG. 10, the names of the nucleic acid bases used in substitution are shown.

Figure 11:
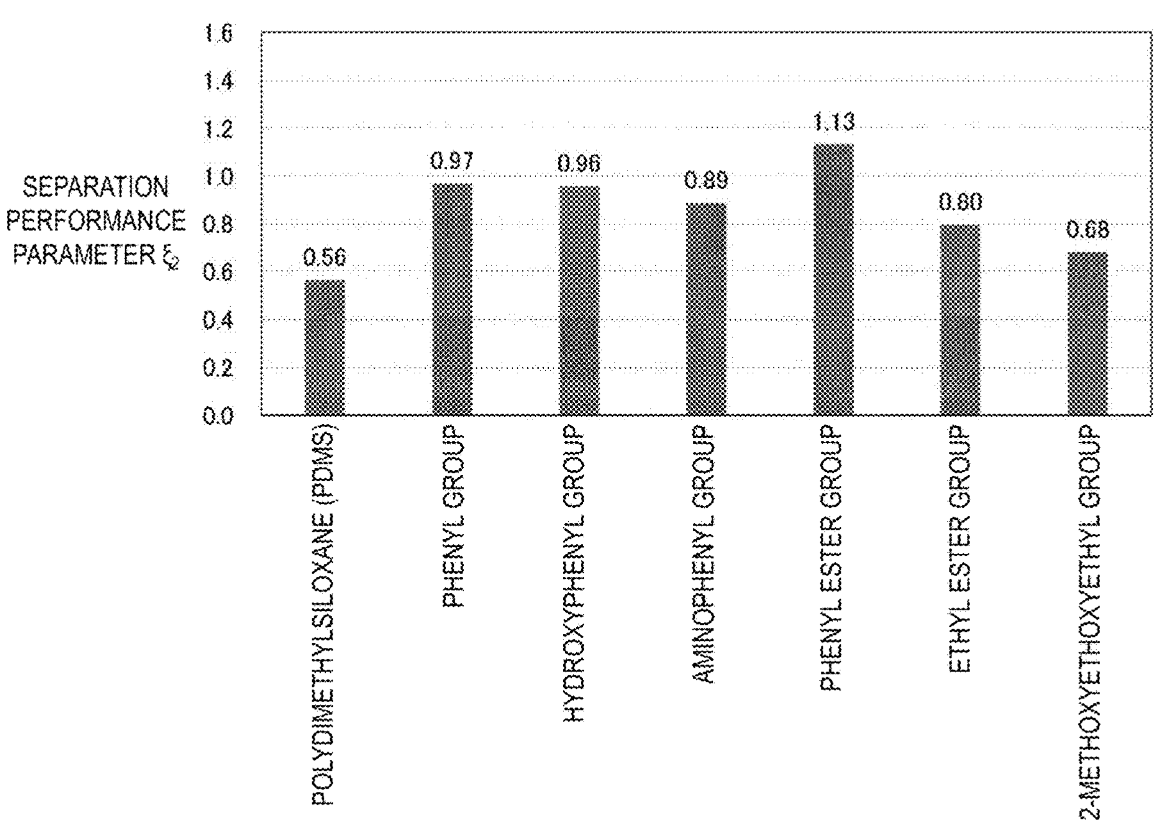
FIG. 11 is a graph for comparing separation performance parameters $\xi_2$ calculated for polydimethylsiloxane derivatives.

FIG. 11 is a graph for comparing the separation performance parameters $\xi_2$ calculated for polydimethylsiloxane derivatives.

FIG. 11 illustrates polydimethylsiloxane derivatives whose separation performance parameter $\xi_2$ satisfies $0.56<\xi_2$. Therefore, when polydimethylsiloxane derivatives are used as the constituent material of the second layer 4, the second layer 4 has high selective separation properties.

Polydimethylsiloxane has a siloxane bond as a main chain and a methyl group in a side chain or at a terminal. Examples of the polydimethylsiloxane derivative herein include derivatives obtained by substituting one or more hydrogen atoms, preferably one hydrogen atom, of a methyl group with a substituent. Examples of the substituent include a phenyl group, a hydroxyphenyl group, an aminophenyl group, a phenyl ester group, an ethyl ester group, and a 2-methoxyethoxyethyl group.

From the results illustrated in FIG. 11, it is understood that both an ester bond and an aromatic ring are preferably contained in the substituent. Thus, the separation performance parameter $\xi_2$ can be made particularly high, and the second layer 4 has particularly high selective separation properties.

In FIG. 11, unsubstituted polydimethylsiloxane (unsubstituted PDMS) is indicated as a compound whose separation performance parameter $\xi_2$ does not satisfy $0.56<\xi_2$.

All of the methyl groups contained in the polydimethylsiloxane may be substituted as described above, but it is preferable that only some of the methyl groups are substituted. Thus, the separation performance parameter $\xi_2$ becomes particularly large in the second layer 4. The separation performance parameters $\xi_2$ illustrated in FIG. 11 each are a value when one of hydrogen atoms of the methyl groups is substituted with each substituent in 25% of the methyl groups contained in the polydimethylsiloxane. In FIG. 11, the names of the substituents used in substitution are shown.

On the other hand, some of polydimethylsiloxane derivatives are compounds whose separation performance parameter $\xi_2$ does not satisfy $0.56<\xi_2$.

Figure 12:
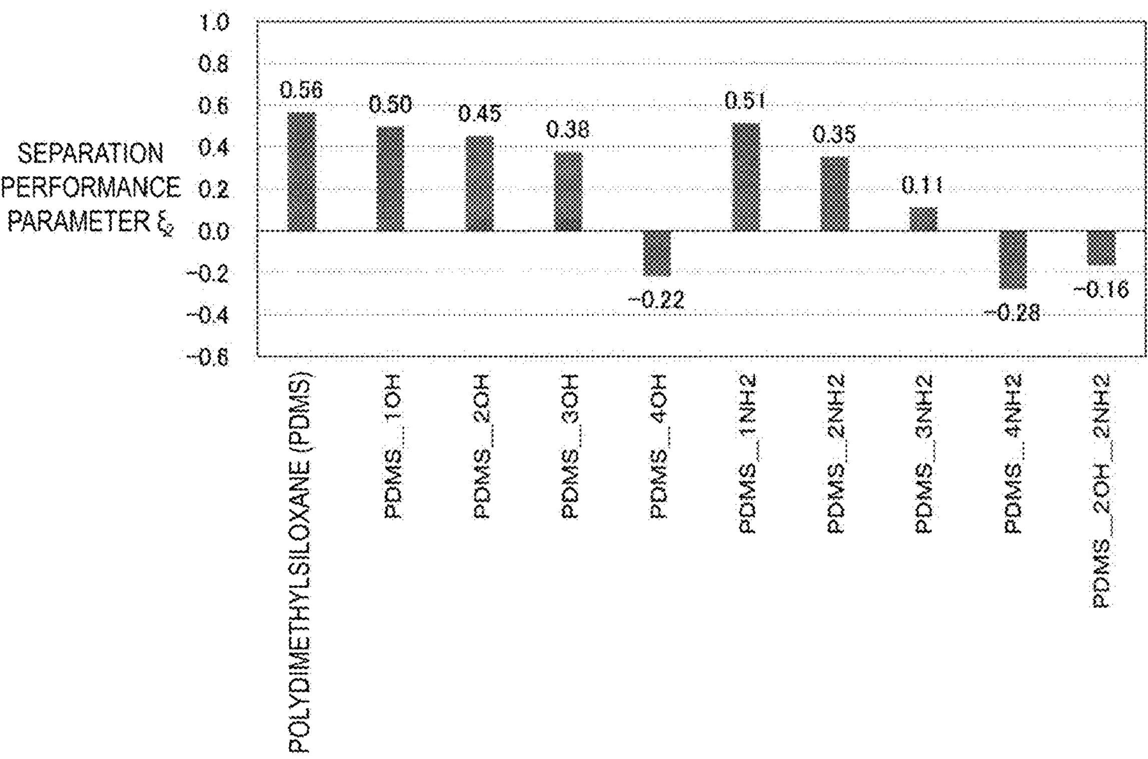
FIG. 12 is a graph for comparing separation performance parameters $\xi_2$ calculated for polydimethylsiloxane derivatives.

FIG. 12 is a graph for comparing the separation performance parameters $\xi_2$ calculated for polydimethylsiloxane derivatives.

FIG. 12 illustrates polydimethylsiloxane derivatives whose separation performance parameter $\xi_2$ does not satisfy $0.56<\mu_2$. That is, all of the polydimethylsiloxane derivatives illustrated in FIG. 12 have a separation performance parameter $\xi_2$ satisfying $\xi_2\leq0.56$.

Polydimethylsiloxane has a siloxane bond as a main chain and a methyl group in a side chain or at a terminal. Examples of the polydimethylsiloxane derivative herein include derivatives obtained by substituting 25%, 50%, 75%, or 100% of methyl groups themselves, among the total number of methyl groups per molecule, with a substituent. The substituent is, for example, a hydroxyl group, an amino group, or both of them.

In FIG. 12, the PDMS derivatives obtained by substituting 25%, 50%, 75%, and 100% of methyl groups themselves with a hydroxyl group are denoted as PDMS_1OH, PDMS_2OH, PDMS_3OH, and PDMS_4OH, respectively. PDMS derivatives obtained by substituting 25%, 50%, 75%, and 100% of methyl groups themselves with an amino group are denoted as PDMS_1NH2, PDMS_2NH2, PDMS_3NH2, and PDMS_4NH2, respectively. Furthermore, a PDMS derivative obtained by substituting 50% of methyl groups themselves with a hydroxyl group and substituting the remaining 50% of the methyl groups themselves with an amino group is denoted as PDMS_2OH_2NH2.

FIG. 12 further illustrates unsubstituted polydimethylsiloxane (unsubstituted PDMS). As illustrated in FIG. 12, even if the methyl group itself is substituted with a functional group, it is difficult to increase the separation performance parameter $\xi_2$. Therefore, when a substituent is introduced into PDMS, it is more desirable to substitute a hydrogen atom of the methyl group.

Figure 13:
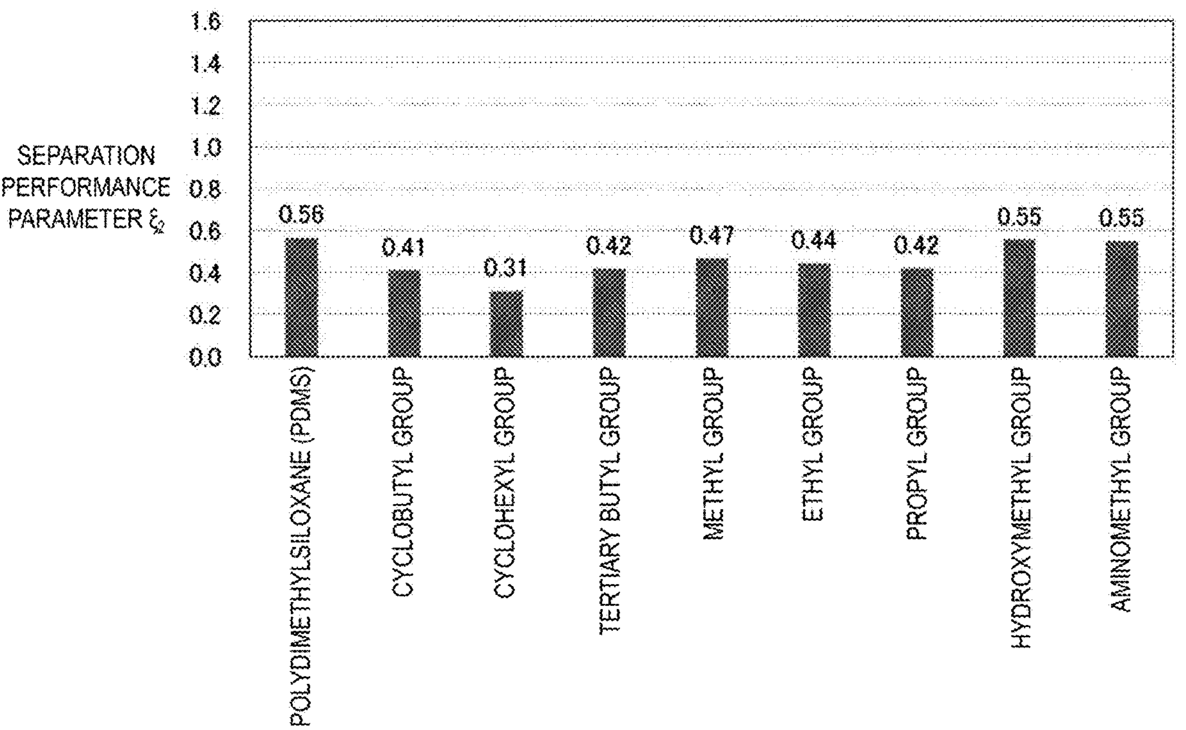
FIG. 13 is a graph for comparing separation performance parameters $\xi_2$ calculated for polydimethylsiloxane derivatives.

FIG. 13 is a graph for comparing the separation performance parameters $\xi_2$ calculated for polydimethylsiloxane derivatives.

FIG. 13 illustrates polydimethylsiloxane derivatives whose separation performance parameter $\xi_2$ does not satisfy $0.56<\xi_2$. That is, all of the polydimethylsiloxane derivatives illustrated in FIG. 13 have a separation performance parameter $\xi_2$ satisfying $\xi_2\leq0.56$.

Polydimethylsiloxane has a siloxane bond as a main chain and a methyl group in a side chain or at a terminal. Examples of the polydimethylsiloxane derivative herein include derivatives obtained by substituting one of hydrogen atoms of 25% of the contained methyl groups with a substituent. Examples of the substituent include a cyclobutyl group, a cyclohexyl group, a tertiary butyl group, a methyl group, an ethyl group, a propyl group, a hydroxymethyl group, and an aminomethyl group.

FIG. 13 further illustrates unsubstituted polydimethylsiloxane (unsubstituted PDMS). In FIG. 13, the names of the substituents used in substitution are shown.

As described above, the polydimethylsiloxane derivative has a higher affinity for carbon dioxide molecules than the unsubstituted PDMS. Therefore, the introduction of a substituent enhances the selective separation properties of carbon dioxide over nitrogen.

On the other hand, the unsubstituted PDMS has high diffusibility of carbon dioxide. That is, the unsubstituted PDMS has high carbon dioxide permeability. Therefore, the polydimethylsiloxane derivative has not only high carbon dioxide permeability derived from the unsubstituted PDMS but also selective separation properties resulting from the introduction of a substituent.

It should be noted that polydimethylsiloxane may be another organopolysiloxane. The organopolysiloxane represented by polydimethylsiloxane has a large interatomic distance of about 1.8 angstroms in Si—O bonds and Si—C bonds forming it and a large free volume, and thus has good diffusibility of carbon dioxide molecules.

1.3. Other Configurations

In addition to the above description of the gas separation membrane 1 according to the embodiment, an optional layer may be provided in at least one of the following locations: downstream of the first layer 3 and between the first layer 3 and the second layer 4. For example, a porous layer composed of a porous body may be provided downstream of the first layer 3. The porous layer preferably has higher gas permeability than the first layer 3 and higher rigidity than the first layer 3. Due to this feature, the rigidity of the gas separation membrane 1 can be further increased, which can contribute to the improvement in shape retention and durability of the gas separation membrane 1.

Examples of the constituent material of the porous layer include a polymer material, a ceramic material, and a metal material. The constituent material of the porous layer may also be a composite material of any of the above-described materials and another material.

Examples of the polymer material include: polyolefin resins, such as polyethylene and polypropylene; fluororesins, such as polytetrafluoroethylene, polyvinyl fluoride, and polyvinylidene fluoride; polystyrene; cellulose acetate; polyurethane; polyacrylonitrile; polyphenylene oxide; polysulfone; polyethersulfone; polyimide; and polyaramid.

Examples of the ceramic material include alumina, cordierite, mullite, silicon carbide, and zirconia. Examples of the metal material include stainless steel.

The average thickness of the porous layer, although not particularly limited, is preferably 1 μm or more and 3000 μm or less, more preferably 5 μm or more and 500 μm or less, and further preferably 10 μm or more and 150 μm or less. This gives the porous layer necessary and sufficient rigidity to support the first layer 3 and the second layer 4.

Note that the average thickness of the porous layer is an average value of thicknesses in the stacking direction measured at ten locations of the porous layer. The thickness measurement of the porous layer can be carried out by using, for example, a thickness gauge.

In addition, the average pore diameter of the porous layer is preferably 0.1 μm or less, more preferably 0.01 μm or more and 0.09 μm or less, and further preferably 0.01 μm or more and 0.07 μm or less. Due to this feature, the first layer 3 is less likely to run over downstream of the porous layer.

The average pore diameter of the porous layer is measured by a through-pore diameter evaluation device. Examples of the through-pore diameter evaluation device include Perm-Porometer available from Porous Materials Inc.

The porosity of the porous layer is preferably 20% or more and 90% or less, and more preferably 30% or more and 80% or less. This allows the porous layer to have both good gas permeability and sufficient rigidity. The porosity of the porous layer is measured by the above-described through-pore diameter evaluation device.

In the gas separation membrane 1 as described above, the selective separation ratio of carbon dioxide over nitrogen is preferably 10 or more, and more preferably 15 or more. Due to this feature, the gas separation membrane 1 is suitable for separating carbon dioxide from the atmosphere. The selective separation ratio of carbon dioxide over nitrogen is determined as the ratio of the permeation rate of carbon dioxide to the permeation rate of nitrogen. In particular, it has been found to be possible to impart good selective separation properties while maintaining good gas permeability derived from PDMS, by introducing a substituent into PDMS.

2. Method for Producing Gas Separation Membrane

The gas separation membrane 1 is produced, for example, by forming a film of a raw material of the second layer 4 on the upper surface 31 of the first layer 3.

Examples of the method for forming the film of the raw material of the second layer 4 include various liquid phase film formation methods such as a dipping method, a dropping method, an inkjet method, a dispenser method, a spraying method, a screen printing method, a coater coating method, and a spin coating method; and gas phase film formation methods such as a plasma CVD method and a plasma polymerization method.

Among these examples, an inkjet method is preferably used. The inkjet method is a method in which ink is ejected and fixed while an inkjet head is moved relative to the upper surface 31. A liquid containing the raw material of the second layer 4 is used as the ink. By using the inkjet method, a target amount of the raw material can be fixed at a target position with high probability. As such, it is possible to form a second layer 4 having a high coverage even though having a small thickness. As a result, a gas separation membrane 1 having high selective separation properties of carbon dioxide over nitrogen and excellent carbon dioxide permeability can be efficiently produced.

Prior to the formation of the second layer 4, the upper surface 31 of the first layer 3 may be subjected to an activation treatment. The activation treatment is not particularly limited as long as the treatment activates the upper surface 31. Examples of the activation treatment include a method of irradiating the upper surface 31 with energy rays, a method of heating the upper surface 31, a method of exposing the upper surface 31 to plasma or corona, and a method of exposing the upper surface 31 to ozone gas. Examples of the energy rays include infrared rays, ultraviolet rays, and visible light.

3. Use of Gas Separation Membrane

The gas separation membrane 1 according to the embodiment can be used in carbon dioxide separation and capture, carbon dioxide separation and purification, and the like, from a mixed gas containing carbon dioxide and nitrogen. In particular, it is effective to use the gas separation membrane 1 in a technique for separating and capturing carbon dioxide contained in the atmosphere (direct air capture (DAC)).

4. Effects Achieved by Embodiment Described Above

As described above, the gas separation membrane 1 according to the embodiment described above is a gas separation membrane that separates, by selective transmission, carbon dioxide from a mixed gas containing the carbon dioxide and nitrogen, and includes the first layer 3 and the second layer 4. The second layer 4 is provided at the upper surface 31 (one surface) of the first layer 3, and is composed of a compound having carbon dioxide separation ability. The average thickness of the second layer 4 is smaller than the average thickness of the first layer 3. The second layer 4 satisfies $0.56<\xi_2$, where an activity coefficient of nitrogen in the second layer 4, calculated by the COSMO-RS method, is $\gamma^2_{N2}$, an activity coefficient of carbon dioxide in the second layer 4 is $\gamma^2_{CO2}$, and a separation performance parameter of the second layer 4 at 25° C. is $\xi_2=\ln(\gamma^2_{N2})-\ln(\gamma^2_{CO2})$.

As described above, the carbon dioxide separation ability can be quantified by an index called a separation performance parameter $\xi_2$ based on the activity coefficient of nitrogen and the activity coefficient of carbon dioxide in the second layer 4. In addition, by making the average thickness of the second layer 4 smaller than that of the first layer 3, good gas permeability can be ensured. Therefore, according to the above-described configuration, the gas separation membrane 1 has both good selective separation properties of carbon dioxide over nitrogen and good carbon dioxide gas permeability.

The first layer 3 and the second layer 4 preferably satisfy $\xi_1<\xi_2$, where an activity coefficient of nitrogen in the first layer 3, calculated by the COSMO-RS method, is $\gamma^1_{N2}$, an activity coefficient of carbon dioxide in the first layer 3 is $\gamma^1_{CO2}$, and a separation performance parameter of the first layer 3 at 25° C. is $\xi_1=\ln(\gamma^1_{N2})-\ln(\gamma^1_{CO2})$.

Due to this feature, the affinity for carbon dioxide molecules as compared with that for nitrogen molecules in the second layer 4 is higher than that in the first layer 3. On the other hand, the affinity for carbon dioxide molecules is lower in the first layer 3 than in the second layer 4, and thus, even if the pressure increases downstream of the gas separation membrane 1, the probability that carbon dioxide having passed through the gas separation membrane 1 penetrates in an opposite direction to the first layer 3 can be reduced.

In addition, the first layer 3 and the second layer 4 preferably satisfy $0.10\leq\xi_2-\xi_1$. This makes it possible to particularly enhance the selective separation properties of carbon dioxide over nitrogen in the gas separation membrane 1.

The compound described above preferably includes a structure derived from polyethylene terephthalate, polyacetal, polylactic acid, cellulose, a cellulose derivative, lignin, or a coupling agent. These compounds provide a separation performance parameter $\xi_2$ satisfying the relationship described above, and has excellent film-forming properties, and the second layer 4 has excellent stability after film formation. In addition, the second layer 4 includes the coupling agent-derived structure, and thus exhibits high affinity for carbon dioxide and is very thin. As a result, the second layer 4 having good selective separation properties and gas permeability can be realized.

In addition, the compound described above preferably includes a PDMS derivative in which one of hydrogen atoms of some of methyl groups included in PDMS is substituted with a substituent. The substituent is preferably an amino group, a cyano group, or a phenyl group.

PDMS has a large free volume, and thus has good diffusibility of carbon dioxide molecules. In addition, the introduction of these substituents enhances the selective separation properties of carbon dioxide over nitrogen. As a result, the second layer 4 having good selective separation properties and gas permeability can be realized.

In addition, the compound described above preferably includes a PDMS derivative in which one of hydrogen atoms of some of methyl groups included in PDMS is substituted with a substituent. The substituent is preferably derived from an organic compound having a π-conjugated cyclic structure.

Thus, the separation performance parameter $\xi_2$ can be made particularly high, and the second layer 4 has particularly high selective separation properties and good gas permeability.

In addition, the compound described above preferably includes a PDMS derivative in which one of hydrogen atoms of some of methyl groups included in PDMS is substituted with a substituent. The substituent preferably contains an ester bond and an aromatic ring.

Thus, the separation performance parameter $\xi_2$ can be made particularly high, and the second layer 4 has particularly high selective separation properties and good gas permeability.

The average thickness of the second layer 4 is preferably 1 nm or more and 100 nm or less. This makes it possible to enhance the gas permeability while ensuring the selective separation properties of the second layer 4.

In addition, the first layer 3 preferably includes an organopolysiloxane. Due to this feature, the first layer 3 has good gas permeability for carbon dioxide.

Although the gas separation membrane according to an aspect of the present disclosure has been described above based on a preferred embodiment, the present disclosure is not limited thereto.

For example, in the gas separation membrane according to an aspect of the present disclosure, each part of the embodiment described above may be replaced with a component having a similar function, and any component may be added to the embodiment described above.

EXAMPLES

Next, specific examples of the present disclosure will be described.

5. Preparation of Gas Separation Membrane

5.1. Example 1

First, a PDMS sheet is provided as the first layer. The PDMS sheet is a 30 μm thick sheet composed of polydimethylsiloxane. Next, one surface of the PDMS sheet was subjected to a plasma treatment as the activation treatment.

Next, an O/W emulsion having a solid content concentration of polyethylene terephthalate (PET) of 50 mass % was prepared. Next, the O/W emulsion, glycerin, triethylene glycol monobutyl ether, and 2-pyrrolidone were mixed to prepare an ink. The prepared ink had a static surface tension of 35 mN/m, a viscosity of 10 mPa·s, and a density of 1.1 g/cc.

Next, the prepared ink was used to prepare a second layer by an inkjet method. Thus, a gas separation membrane was obtained. The separation performance parameters and average thicknesses of the first and second layers are presented in Table 2.

5.2. Examples 2 to 5

Gas separation membranes were obtained in the same manner as in Example 1 except that the constituent material of the second layer was changed to those as presented in Table 2.

5.3. Examples 6 to 8

Gas separation membranes were obtained in the same manner as in Example 1 except that a compound obtained by introducing a substituent presented in Table 2 into PDMS was used as the constituent material of the second layer. This substituent substitutes one of hydrogen atoms of 25% by mole of methyl groups, among the methyl groups contained in PDMS.

5.4. Comparative Example 1

The second layer was not formed, and only the first layer was used as the gas separation membrane of Comparative Example 1.

5.5. Comparative Example 2

A gas separation membrane was obtained in the same manner as in Example 1 except that unsubstituted PDMS was used as the constituent material of the second layer.

5.6. Examples 9 to 14

Gas separation membranes were obtained in the same manner as in Example 1 except that a compound obtained by introducing a substituent presented in Table 3 into PDMS was used as the constituent material of the second layer.

5.7. Comparative Examples 3 and 4

Gas separation membranes were obtained in the same manner as in Example 1 except that a compound obtained by introducing a substituent presented in Table 3 into PDMS was used as the constituent material of the second layer. This substituent substitutes 25% by mole of methyl groups themselves, among the methyl groups contained in PDMS.

5.8. Comparative Example 5

Gas separation membranes were obtained in the same manner as in Example 1 except that a compound obtained by introducing a substituent presented in Table 3 into PDMS was used as the constituent material of the second layer. This substituent substitutes one of hydrogen atoms of 25% by mole of methyl groups, among the methyl groups contained in PDMS.

6. Evaluation of Gas Separation Membrane

The gas separation membranes of Examples and Comparative Examples were evaluated as follows.

6.1. Gas Permeability

The gas separation membranes of Examples and Comparative Examples were cut into circles having a diameter of 5 cm, resulting in test samples. Next, a mixed gas in which carbon dioxide and nitrogen were mixed at a volume ratio of 13:87 was supplied upstream of the test samples using a gas transmission rate measuring device. Note that, the total pressure upstream was adjusted to 5 MPa, the partial pressure of carbon dioxide was adjusted to 0.65 MPa, the flow rate was adjusted to 500 mL/min, and the temperature was adjusted to 40° C. Then, gas components passed through the test samples were analyzed by gas chromatography.

Next, based on the analytical results, carbon dioxide gas permeation rates $R_{CO2}$ at the gas separation membranes were calculated. Subsequently, the degree of decrease in gas permeation rate $R_{CO2}$ calculated for the gas separation membrane of each Example and each Comparative Example relative to the gas permeation rate $R_{CO2}$ calculated for the gas separation membrane without formation of the second layer (the gas separation membrane composed only of the first layer), as a reference, was calculated as "$CO_2$ permeability decrease rate". The $CO_2$ permeability decrease rate is a proportion of a decrease width to the above-described reference. Then, relative evaluation of the gas permeabilities of the gas separation membranes was performed by comparing the calculated $CO_2$ permeability decrease rates with the following evaluation criteria. The evaluation results are presented in Tables 2 and 3.

A: The $CO_2$ permeability decrease rate is 20% or less.

B: The $CO_2$ permeability decrease rate is more than 20% and 30% or less.

C: The $CO_2$ permeability decrease rate is more than 30%.

6.2. Selective Separation Properties

Next, based on the analytical results described above, nitrogen gas permeation rates $R_{N2}$ at the gas separation membranes were calculated. Subsequently, a ratio of the carbon dioxide gas permeation rate $R_{CO2}$ to the nitrogen gas permeation rate $R_{N2}$, or $R_{CO2}/R_{N2}$, was calculated. Then, relative evaluation of the selective separation properties of the gas separation membranes was performed by comparing the ratio $R_{CO2}/R_{N2}$ with the following evaluation criteria. The evaluation results are presented in Tables 2 and 3.

A: The ratio $R_{CO2}/R_{N2}$ is greater than that in Comparative Example 1.

B: The ratio $R_{CO2}/R_{N2}$ is equivalent to that in Comparative Example 1.

C: The ratio $R_{CO2}/R_{N2}$ is less than that in Comparative Example 1.

TABLE 2

| | | | | Example 1 | Example 2 | Example 3 | Example 4 | Example 5 | Example 6 |
|---|---|---|---|---|---|---|---|---|---|
| Configuration of gas separation membrane | First layer | Constituent material | — | PDMS | PDMS | PDMS | PDMS | PDMS | PDMS |
| | | Average thickness | μm | 30 | 30 | 30 | 30 | 30 | 30 |
| | | Separation performance parameter ξ1 | — | 0.56 | 0.56 | 0.56 | 0.56 | 0.56 | 0.56 |
| | Second layer | Constituent material | — | PET | POM | PLA | Cellulose | Lignin | PDMS |
| | | Substituent | — | — | — | — | — | — | Acetyl group |
| | | Average thickness | nm | 100 | 100 | 100 | 100 | 100 | 80 |
| | | Separation performance parameter ξ1 | — | 1.32 | 1.32 | 0.95 | 0.63 | 1.00 | 1.14 |
| | | ξ2 − ξ1 | — | 0.76 | 0.76 | 0.39 | 0.07 | 0.44 | 0.58 |
| | | Film formation method | — | | | Inkjet method | | | |
| Evaluation result of gas separation membrane | Gas permeability | | | B | B | B | B | B | A |
| | Selective separation properties | | | A | A | A | B | A | A |

| | | | | Example 7 | Example 8 | Comparative Example 1 | Comparative Example 2 |
|---|---|---|---|---|---|---|---|
| Configuration of gas separation membrane | First layer | Constituent material | — | PDMS | PDMS | PDMS | PDMS |
| | | Average thickness | μm | 30 | 30 | 30 | 30 |
| | | Separation performance parameter ξ1 | — | 0.56 | 0.56 | 0.56 | 0.56 |
| | Second layer | Constituent material | — | PDMS | PDMS | — | Unsubstituted PDMS |
| | | Substituent | — | Glycidyl group | Phenyl group | — | |
| | | Average thickness | nm | 80 | 80 | — | 100 |
| | | Separation performance parameter | — | 0.92 | 0.97 | — | 0.56 |

TABLE 2-continued

| | | | | | | |
|---|---|---|---|---|---|---|
| | ξ1 | | | | | |
| | ξ2 − ξ1 | — | 0.36 | 0.41 | — | 0.00 |
| | Film formation method | — | Inkjet method | | — | Inkjet method |
| Evaluation result of gas separation membrane | Gas permeability | | A | A | A | A |
| | Selective separation properties | | A | A | — | C |

TABLE 3

| | | | | Example 9 | Example 10 | Example 11 | Example 12 | Example 13 |
|---|---|---|---|---|---|---|---|---|
| Configuration of gas separation membrane | First layer | Constituent material | — | PDMS | PDMS | PDMS | PDMS | PDMS |
| | | Average thickness | μm | 30 | 30 | 30 | 30 | 30 |
| | | Separation performance parameter ξ1 | — | 0.56 | 0.56 | 0.56 | 0.56 | 0.56 |
| | Second layer | Constituent material | — | PDMS | PDMS | PDMS | PDMS | PDMS |
| | | Substituent | — | Phenyl-alanine-derived | Uracil-de-derived | Benzim idazole-derived | Phenyl group | 2-Propenyl group |
| | | Average thickness | nM | 80 | 60 | 70 | 100 | 100 |
| | | Separation performance ξ1 | — | 1.03 | 1.11 | 1.14 | 0.97 | 0.80 |
| | | ξ2 − ξ1 | — | 0.47 | 0.55 | 0.58 | 0.41 | 0.24 |
| | | Film formation method | — | | | Inkjet method | | |
| Evaluation result of gas separation membrane | Gas permability | | | A | A | A | A | A |
| | Selective separation | | | A | A | A | A | B |

| | | | | Example 14 | Comparative Example 3 | Comparative Example 4 | Comparative Example 5 |
|---|---|---|---|---|---|---|---|
| Configuration of gas separation membrane | First layer | Constituent material | — | PDMS | PDMS | PDMS | PDMS |
| | | Average thickness | μm | 30 | 30 | 30 | 30 |
| | | Separation performance parameter ξ1 | — | 0.56 | 0.56 | 0.56 | 0.56 |
| | Second layer | Constituent material | — | PEM | PDMS | PDMS | PDMS |
| | | Substituent | — | Phenyl ester group | Hydroxyl group (methyl group-substituted) | Amino group (methyl group-substituted) | Hydroxy-methyl group |
| | | Average thickness | nM | 100 | 80 | 80 | 80 |
| | | Separation performance ξ1 | — | 1.13 | 0.50 | 0.51 | 0.55 |
| | | ξ2 − ξ1 | — | 0.57 | −0.06 | −0.05 | −0.01 |
| | | Film formation method | — | Inkjet method | | Inkjet method | |
| Evaluation result of gas separation membrane | Gas permability | | | A | A | A | A |
| | Selective separation properties | | | A | C | C | C |

As is clear from Tables 2 and 3, the gas separation membrane of each Example had a small decrease in gas permeability relative to the reference (small $CO_2$ permeability decrease rate), and had high selective separation properties as compared with those in each Comparative Example. This demonstrated that, when the separation performance parameter $\xi_2$ of the second layer at 25° C. satisfies a predetermined relationship, a gas separation membrane having high selective separation properties of carbon dioxide over nitrogen and good carbon dioxide gas permeability can be realized. In particular, when the second layer was composed of a compound obtained by introducing a substituent into PDMS, this tendency was remarkable.

What is claimed is:

1. A gas separation membrane that separates, by selective transmission, carbon dioxide from a mixed gas containing the carbon dioxide and nitrogen, the gas separation membrane comprising:

a first layer, wherein the first layer includes an organopolysiloxane; and a second layer provided at one surface of the first layer and composed of a compound having carbon dioxide separation ability, wherein the compound of the second layer includes one of:

a structure derived from one of polyethylene terephthalate, polyacetal polylactic acid, cellulose, a cellulose derivative, lignin, or a coupling agent, or a polydimethylsiloxane derivative, an average thickness of the second layer is smaller than an average thickness of the first layer, and the second layer satisfies $0.56<\xi_2$, where an activity coefficient of nitrogen in the second layer, calculated by a COSMO-RS method, is $\gamma^2_{N2}$, an activity coefficient of carbon dioxide in the second layer is $\gamma^2_{CO2}$, and a separation performance parameter of the second layer at 25° C. is $\xi_2=\ln(\gamma^2_{N2})-\ln(\gamma^2_{CO2})$.

2. The gas separation membrane according to claim 1, wherein the first layer and the second layer satisfy $\xi_1<\xi_2$, where an activity coefficient of nitrogen in the first layer, calculated by the COSMO-RS method, is $\gamma^1_{N2}$, an activity coefficient of carbon dioxide in the first layer is $\gamma^1_{CO2}$, and a separation performance parameter of the first layer at 25° C. is $\xi_1=\ln(\gamma^1_{N2})-\ln(\gamma^1_{CO2})$.

3. The gas separation membrane according to claim 2, wherein the first layer and the second layer satisfy $0.10\leq\xi_2-\xi_1$.

4. The gas separation membrane according to claim 1, wherein in the polydimethylsiloxane derivative, one of hydrogen atoms of some of methyl groups included in polydimethylsiloxane is substituted with a substituent, and the substituent is an amino group, a cyano group, or a phenyl group.

5. The gas separation membrane according to claim 1, wherein in the polydimethylsiloxane derivative, one of hydrogen atoms of some of methyl groups included in polydimethylsiloxane is substituted with a substituent, and the substituent is derived from an organic compound having a π-conjugated cyclic structure.

6. The gas separation membrane according to claim 1, wherein in the polydimethylsiloxane derivative, one of hydrogen atoms of some of methyl groups included in polydimethylsiloxane is substituted with a substituent, and the substituent includes an ester bond and an aromatic ring.

7. The gas separation membrane according to claim 1, wherein the average thickness of the second layer is 1 nm or more and 100 nm or less.

8. The gas separation membrane according to claim 1, wherein the average thickness of the first layer is 10 μm or more and 150 μm or less.

9. The gas separation membrane according to claim 1, wherein the compound includes the polydimethylsiloxane derivative in which one of hydrogen atoms of some of methyl groups included in polydimethylsiloxane is substituted with a substituent, and the substituent includes an ester bond and an aromatic ring.

* * * * *